US008122114B1

(12) United States Patent
Krishnamoorthy et al.

(10) Patent No.: US 8,122,114 B1
(45) Date of Patent: Feb. 21, 2012

(54) MODULAR, DYNAMICALLY EXTENSIBLE, AND INTEGRATED STORAGE AREA NETWORK MANAGEMENT SYSTEM

(75) Inventors: Suban Krishnamoorthy, Shrewsbury, MA (US); Christopher Stroberger, Worcester, MA (US); Steven Peters, Shrewsbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3111 days.

(21) Appl. No.: 09/684,472

(22) Filed: Oct. 6, 2000

(51) Int. Cl.
*G06F 15/173* (2006.01)
(52) U.S. Cl. ........................ 709/223; 709/224
(58) Field of Classification Search ................... 709/223, 709/224, 221, 225; 710/302
See application file for complete search history.

(56) References Cited

U.S. PATENT DOCUMENTS

| | | | | | |
|---|---|---|---|---|---|
| 5,758,083 | A | * | 5/1998 | Singh et al. | 709/223 |
| 5,931,911 | A | * | 8/1999 | Remy et al. | 709/223 |
| 6,067,568 | A | * | 5/2000 | Li et al. | 709/223 |
| 6,212,585 | B1 | * | 4/2001 | Chrabaszcz | 710/302 |
| 6,360,255 | B1 | * | 3/2002 | McCormack et al. | 709/221 |
| 6,374,296 | B1 | * | 4/2002 | Lim et al. | 709/225 |
| 6,421,723 | B1 | * | 7/2002 | Tawil | 709/224 |
| 6,654,801 | B2 | * | 11/2003 | Mann et al. | 709/224 |

\* cited by examiner

*Primary Examiner* — Philip Lee

(57) ABSTRACT

A client-server based Storage Area Network (SAN) management system provides easy to use and uniform multiple user interfaces such as web interface and windows interface to the administrators to manage the SAN consisting of various types of devices. The integrated object-oriented management agent consists of several components such as object manager, UI module, web server, user interface modules, error and status handler and device handler. The agent functionality can be dynamically expanded to handle new device types without stopping the existing agent, installing new agent and restarting it. The management system uses conglomerate methods to automatically discover SAN devices and their topology. The error and status from SAN devices are handled in a hybrid method consisting of distributed, hierarchical and centralized schemes. A simple and easy device independent user interface is provided to download firmware to various types of devices hiding complex device dependent processes from the administrator. The system can manage multiple SANs. It can run on various environments such as an appliance, host, in a cluster, or on a client station. Where reliability is required, it can run on a fault tolerant system as well as multiple copies can be run simultaneously.

18 Claims, 4 Drawing Sheets

MODULAR, DYNAMICALLY EXTENSIBLE, AND INTEGRATED STORAGE AREA NETWORK MANAGEMENT SYSTEM

The invention is related to the field of Storage Area Network (SAN). In particular, the invention relates to systems for managing storage, hosts, and SAN interconnect devices such as switches, hubs, and routers. In the broader scope, it can be applied to computer networks and is not necessarily limited to SAN.

BACKGROUND OF THE INVENTION

Storage Area Network (SAN) consists of hosts, storage devices, and appliances interconnected by devices such as switches, hubs, and bridges. The word "device" refers to any component such as switch, hub, bridge, hosts, appliance, or a storage in the SAN. The phrase "SAN Interconnect" refers to the collection of SAN switches, hubs and bridges that are used to interconnect appliances, hosts and storage devices. Sometimes, the word "component" is used to place of the word device. In some cases hosts may be referred as "servers".

Some of the devices may be connected to local area network (LAN) such as Ethernet, Token Ring, and or wide area networks (WAN) such as ATM (Asynchronous Transfer Mode), etc. Today, SAN interconnect components are mostly fibre channel components. They are specially developed to interconnect SAN devices as a dedicated backend storage network. At the same time, efforts are also underway to perform storage management using IP (Internet Protocol) network SAN is a relatively new technology. The standards for SAN are still evolving. It is in its infancy at this time. However, it is growing rapidly. Managing the SAN is an important function for system administrators. There are one or more management stations to manage the SAN. They may have direct connection to the SAN or may be connected remotely through other networks such as Internet or LAN. System administrators use the management station to perform management functions.

SAN management is based on the client-server architecture. The management agent constitutes the server part. Agents can reside on any device such as host, switch appliance, and others. It can also be distributed in the sense some management functions may be on one device and others on a different device. There could one or more agents in the SAN management environment depending on the number of devices and types of devices.

The system on which the client resides is called the management station. There could be one or more management stations to manage the SAN. They may have direct connection to the SAN or may be connected remotely through other networks such as Internet or LAN. System administrators use the client running on the management station to perform management functions Typical SAN management functions include partitioning of disk sets of storage into volumes, rebuilding RAID sets when a disk fails, handling events and alerts related to device status changes, errors, and failures, managing access privileges, updating firmware on various devices, backing up and restoring data, performance monitoring, and reconfiguring the SAN.

The SAN can be administered locally or remotely. The administration could be done from a central location or it can be distributed. It is often convenient for companies with several branches at different geographic locations, to perform management from a central location and performing branch level management only on a need basis.

A prior-art method of managing devices is to provide an attachment point for a terminal having keyboard and monitor into each device directly. This is a local management method and requires the administrator to be physically present where the device is located. This method is expensive and inconvenient.

Another prior-art method of managing devices is to utilize terminal emulator program running on a computer to RLOGIN or TELNET to the device. Then, the administrator can send commands to the device to manage the device. Sometimes, this is referred as Command Line Interface (CLI). Currently available devices have wide variety of commands and formats; there is little uniformity among vendors of SAN device manufacturers such that this method requires each SAN administrator to be familiar with large number of disparate commands and display formats used by each type of device. This puts undue burden on the administrators as well as significant amount of training in managing the SAN.

Almost all devices including Host Bus Adapter (HBAs), storage controllers, and SAN interconnect devices have firmware in them that enable these devices to perform their functions. It is sometimes necessary for administrators to update the firmware on these devices. Many methods of firmware update have heretofore been used, including manual replacement of a chip or card attached to the device as well as execution of a firmware loader program on a hosts attached to the device via serial line, SCSI or IP connection. It is common to find that various devices require different methods of loading firmware; there is no uniformity in firmware download among device manufacturers. The administrators task will be simplified if there is a simple, and uniform firmware download method for all devices that hides the cumbersome device specific characters from the administrator.

The interface necessary to perform management are evolving along with SAN. Some SAN vendors provide Windows interface, some provide web interface, some provide SNMP based MIB (Management Information Base) interface, and still others provide a command line interface for management. SNMP and serial line interfaces are well established prior-art interfaces in the network arena. Some vendors provide more than one interfaces in their devices. For example, a fibre channel fabric switch may have a management agent running in it's firmware providing web interface, Management Information Block (MIB) interface, and or serial line interface. Large vendors and solution providers supply multitude of SAN products having different management interfaces.

Existing SAN management architectures and products lack a coherent way of integrating the multitude of interfaces and providing appropriate interface(s) to the administrators based on the customer's needs and environments from a single management agent. For example, existing management tools can support either a web interface or a Windows interface, and not both; their architecture does not permit to support both interfaces.

In addition, existing management tools are not capable of dynamic addition of new device types, and deletion of existing device types. When a new device type has to be added, the current agent has to be stopped, and a new agent has to be installed and started. For example, let us say, an agent knows how to manage fabric switches only. If that agent has to be enhanced to handle hubs also, then the current agent has to be stopped, a new agent has to be installed that is capable of handling both fabric switch type and hub type devices in place of the existing agent. Then the new agent has to be started.

During this period of time, no management can be performed on the SAN. It could be convenient if various device types could be added and removed dynamically while the SAN management agent is running without the need to shutdown or restart. It would be desirable to continue to be able to perform management functions while new device types are added to the agent.

Depending on the configuration and the size, a company may have one or more SANs having few devices to thousands of devices in a SAN. In order to manage these devices, it is necessary that the list of devices in the SAN be available to the management agent(s). A common technique is for the administrators to manually enter the list of devices in the SAN and their addresses. This is a tedious process. If the devices can be automatically discovered and monitored, it will simplify management. Not all SAN devices are manageable devices. Some are unmanaged devices such as unmanaged hub; its presence is transparent. It is not possible to automatically discover it. Hence, an hybrid of automatic and manual method must be used to find all the devices in a SAN.

SUMMARY OF THE INVENTION

An integrated, modular, and dynamically expandable Storage Area Network (SAN) management system has been proposed to manage one or more SANs consisting of varying device types such as fabric switches, loop switches, hubs, routers, hosts, storage systems and appliances. It provides multiple user interfaces (UI) such as windows user interface and web interface from a single agent in an integrated and unified form. Its modular design enables to add or delete additional user interfaces to the agent. The web server services web client and the windows interface module services the windows client.

The object-oriented agent contains an Object Manager (OM). Various devices to be managed are represented as objects in the OM.

The content of the information presented to the user is stored in the UI module. Some of the information in the UI are static and others are dynamic. Dynamic information is obtained from the SAN (devices) on the fly depending on the management operation performed by the user and incorporated into the content and then presented to the user.

In order to get information about the SAN (devices) the OM interacts with the Device Handler (DM) in the agent. The DM has an object sublayer and a device specific protocol sublayer. The device object sublayer hides the device specific protocols from OM.

The agent can be dynamically expanded to support new devices types by installing appropriate device handlers, object and methods, and UI modules, for the new type of devices added to the SAN. It is dynamically integrated into the existing agent by performing appropriate configuration while the agent is running. Similarly existing device type capabilities can be removed from the agent by uninstalling and reconfiguring the agent. All these can be accomplished dynamically while the agent is running and continuing to perform SAN management. There is no need to bring the agent down, for installation of new agents.

The agent can automatically discover the devices in the SAN and their connectivity using a conglomerate method comprising scanning ranges of addresses and figuring out the SAN devices in those addresses, contacting name servers, collecting addresses from packets of the network traffic and then accessing devices in those addresses to identify them and their attached peripherals, identifying storage devices that use storage protocols such as SCSI and discovering their management agents running on hosts or appliances, using SNMP to discover SNMP devices and their agents, and interacting with the administrator to get information about additional devices in the SAN.

A combination of distributed, hierarchical and centralized schemes are used to handle traps, errors and status information from the SAN (devices). Processing of the error and status is performed at various levels starting from the device, host and centralized system. The administrator can view and manage the error and status information at various levels.

A simple and uniform device independent interface is provided to the administrator to download firmware to various types of SAN devices. The complex and device dependent processes are kept hidden behind the simple user interface in the system, thus keeping the administrator's task simple.

The integrated agent can run on a host (server) or SAN management appliance system or in a cluster environment or even on the client management station itself.

The SAN management system is versatile, modular, dynamically expandable and has easy to use, uniform, multiple user interfaces that can be selected according to the administrators needs.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF THE EMBODIMENTS

Figure 1:
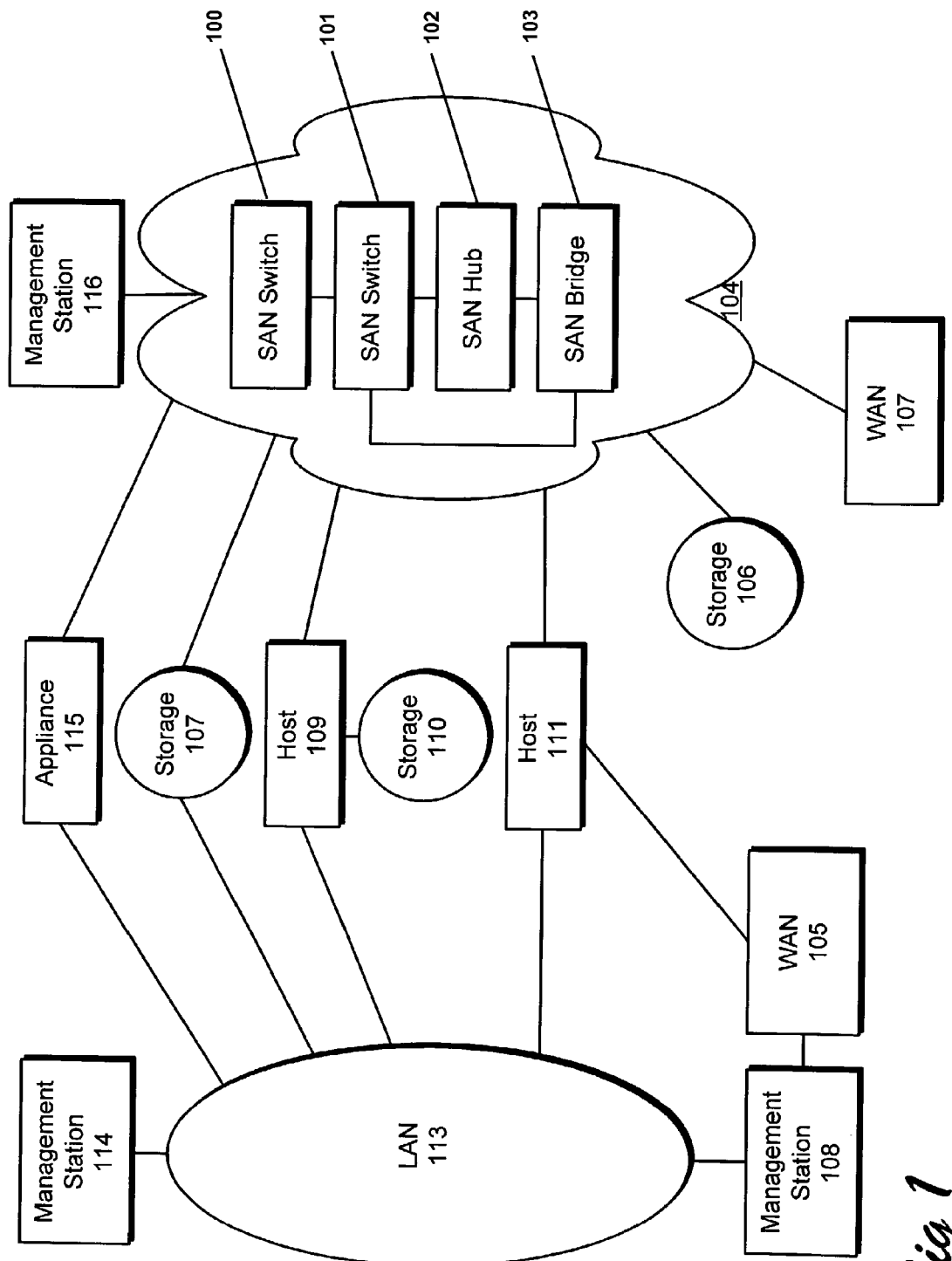
FIG. 1 is a diagram of a storage area network upon which management functions may be carried out.
Figure 2:
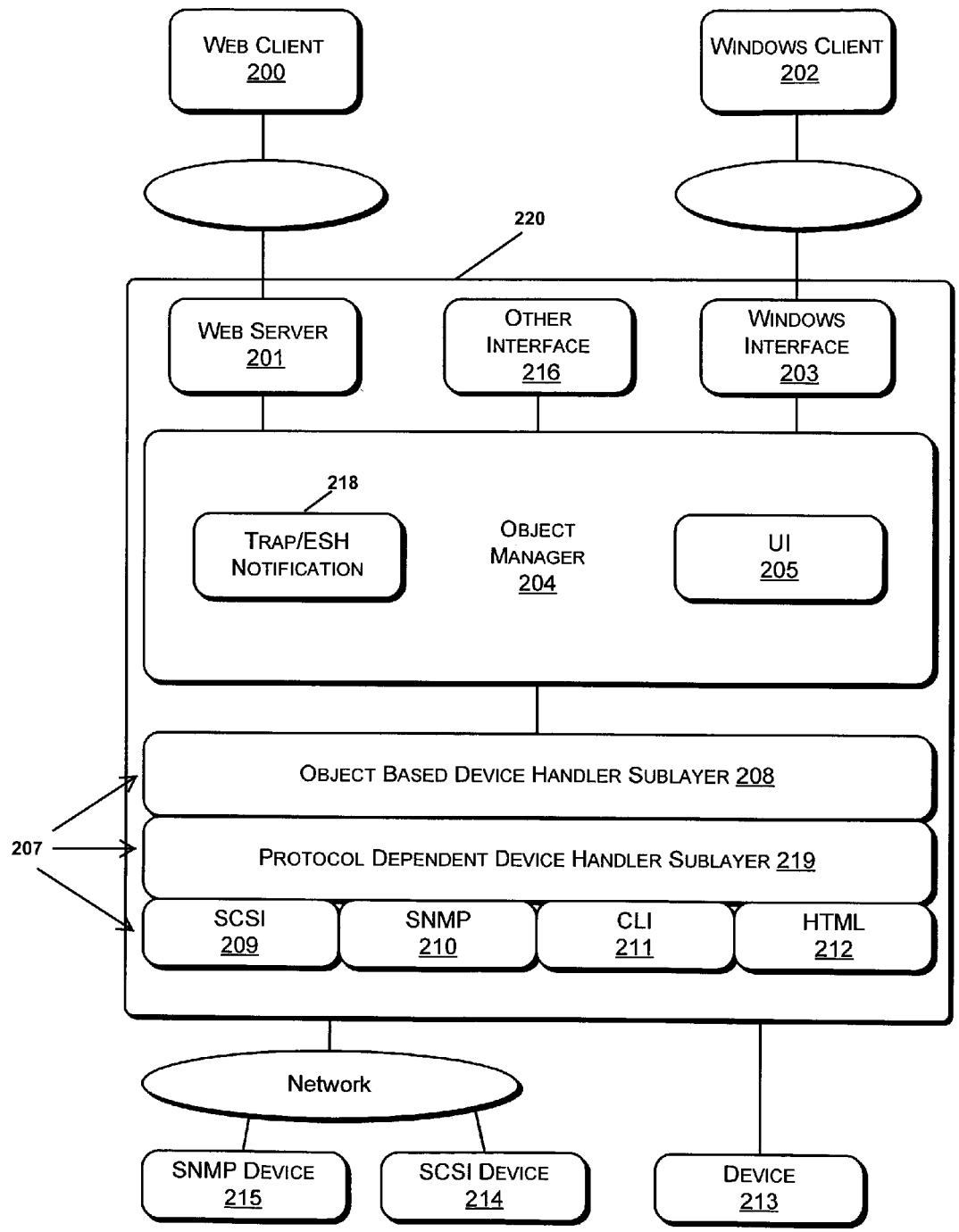
FIG. 2 is an architectural diagram of a SAN management system of the present invention.

A Storage Area Network (SAN) consists of several devices such as storage 106, 107, hosts 109, 111, Appliance 115, and management stations 108, 114 and 116 as shown in FIG. 1. These devices are connected together using switches 100, 101, hubs 102 and bridges (routers) 103. The cloud consisting of interconnect devices is called SAN Interconnect 104.

The SAN interconnect components as well as the hosts may have connection to a Wide Area Network (WAN) 105, 107. The hosts are invariably connected to a Local Area Network (LAN) 113. Often interconnect components such as switches, hubs, and routers are also connected to the LAN and support an Internet Protocol (IP) stack for management purposes.

Administrators use one or more management stations to manage the SAN. A management station 116 could be directly connected to the SAN, or it 113 can be connected via LAN, or it 108 could also connected through a WAN such as Internet, Asynchronous Transfer Mode (ATM) network, etc.

The storage systems could be RAID systems with controllers, tape libraries, and/or Just Bunch Of Disks (JBOD) in a shelf. Sometimes, the storage could be even a single disk connected to the SAN. It is possible that one or more hosts (servers) could have storage 110 that is directly attached to it instead of the SAN.

Some SANs may have one or more Appliances. A Management Appliance 115 is a special purpose system designed for SAN management. It is attached to the SAN using one or more Host Bus Adapters (HBAs) and connected to the LAN for management purposes. Management software runs on the Management Appliance. Other types of appliances may exist in a network.

The management agent(s) run on the management appliances and/or hosts. The client portion of the management software runs on the management station. The agents running on the hosts and or the appliances discover, and monitor SAN devices and interconnect components, as well as manage the SAN. There may be SAN management applications running on the hosts and Appliances. These management applications, agents, clients, management station and appliances are integral part of the SAN management system.

In an embodiment of the SAN management system of the present invention, an integrated and dynamically expandable management agent 220 is provided. Multiple interfaces 201, 203, and 216 are supported from the single agent in a coherent and an integrated form. In the preferred embodiment, a web based interface is provided by a web server 201 to a web client 200 running a browser at the management station. A second Windows interface 203 supports a Windows client 202 running on the same or another management station. Prior agents are limited to providing either the web based user interface only or the windows based interface only. They do not provide both of the interfaces in a single agent. The SAN administrators can use one or more the interfaces according to their convenience.

Under some environments, the agent may have to interface programmatically with third party management software or applications requiring different interface than a windows interface or web interface. The agent may have to support new or additional client interfaces such as X-Windows as need arises. The agent can be dynamically extended easily and modularly to provide other interfaces 216 as needed by adding newer interface modules to the agent.

In the object-oriented design of the preferred embodiment, various entities are represented by objects. In one instance of the preferred embodiment of the agent, various devices in the SAN are represented as objects in the agent. The object manager 204 creates, manages and deletes various objects. Upon requests from the client, the object manager provides content from the user interface (UI) 205 component of the agent. The object manager uses device interface 207 to interact with the devices to get and set attributes of device objects based on the management and monitoring functions to be performed.

The SAN has heterogeneous devices 213, 214, 215 such as switches, hubs, routers, storage, and others. Some of the storage devices 213 may be directly attached to the host while most of the devices 214 and 215 are attached to the SAN. Each device supports an interface to communicate with it, but these interfaces are not standardized. For example, a switch provides SNMP protocol for control, command and management. On the other hand, some storage devices provide SCSI protocol for management. Still other devices provide a command line interface (CLI) for management. Some devices, such as switches, provide HTML protocol interface. A device that provides SNMP support will have an SNMP agent and associated MIB(s).

The device handler 207 in the agent provides interface to the device. In this embodiment, the device handler consists of an object based device handler sublayer 208 and a protocol dependent device handler sublayer 219. The later sublayer supports multiple protocols such as SCSI 209, SNMP 210, CLI 211, and HTML 212. The device handler is modular in addition to being layered. There is one module for each device type. Each device type specific module can be installed and uninstalled independent of others. Based on the device to be managed, this sublayer automatically uses the appropriate device type specific protocol supported by the device to communicate with it. This two sublayer approach to the device handler is unique to the agent design of the invention. The advantage of this dual sublayer design is that additional device type specific protocols can be easily added without affecting the object manager; also this hides the device specific protocol and characteristics from the object manager permitting object level interface to the devices.

In a dynamic environment, new storage device types are added to the SAN and old device types are removed. For example, a small SAN may have only the hub type devices for interconnecting storage and hosts. The installed agent may knows how to manage hub type devices only. As the SAN expands the administrator may connect a fabric switch to the SAN. Since the agent knows how to manage the hub type devices only, and not fabric switch type devices, it will not be able to manage the fabric switches. To enable the agent to mange the fabric switch type devices, in earlier systems, the current agent has to be stopped, and new agent software that knows how to manage both hub type devices and switch type devices must be installed in place of the current agent. Then the new agent has to be started to manage both the hub and fabric switch type devices. With earlier SAN management agents it was not possible to dynamically expand the functionalities of the current agent to handle new device types that it does not know without installing a new agent with appropriate functionality. This is not only tedious, but SAN management cannot be performed during this period.

The invention provides for dynamic addition and deletion of device types to an existing agent while it is running. The agent of the invention maintains a dynamic list of all device types it can handle. Associated with each device type, there is a list of objects and methods. Whenever a device type-specific module is installed to the object manager, the device types that module can work with are added to this dynamic list.

The objects provide, among other things, user interface information such as web pages, object attributes, device handler for the device type, etc. The objects vary depending on the device type. The methods of the objects provide code that manipulates the objects.

To add a new device type, the code containing the objects and methods, device handler, etc. to handle the device type is installed while the agent is running. Using appropriate configuration methods, an entry for the new device type is added to the dynamic list of device types maintained in the agent. Now the agent is ready to handle the new device type. When the user performs management functions for the new device types, the agent searches through its dynamic list, finds the entry for the new device type, then invokes appropriate methods of the device type object and performs the management function.

In a similar process, to remove support for a device type, the entry for the device type in the dynamic list is removed by communicating with the agent. Then the code for the device type may be removed from the system. Thus support for the device type is removed from the agent while the agent is running. If a user tries to remove the support for a device type while an administrator is in the process of managing a device of the type to be removed, the agent warns the user with appropriate message.

The integrated SAN management agent 220 manages one or more devices in the SAN. In order to manage the devices in the SAN, the integrated agent must discover them. Some of the devices are SNMP devices. Such devices have an IP address, and a SNMP agent with an associated MIB running in them. An entity that knows the IP address of the an SNMP device can talk to the agent and get information from the MIB using the SNMP protocol. The information in the MIB helps to identify the type of the device. The SNMP agent also manages the device. Storage devices rarely have IP address or SNMP agents in the controller. Such devices are managed with SCSI protocol or CLI commands. For these devices, storage management agent software runs on a host or appliance and manages the storage device using a CLI or the SCSI protocol. To manage the storage devices the integrated agent 220 has to discover the storage agents running on the hosts and appliances. All hosts have IP addresses. The integrated agent access the host using the IP address to discover the storage agents running on that host.

The integrated agent 220 uses several schemes to discover the SAN devices and the agents to manage them. In the first scheme, the administrator inputs information about hosts, which is then used to discover the agents running on the hosts and devices using defined interface(s). This is the manual approach. It is possible to auto discover systems, agents and manageable devices in the SAN. In a second scheme, the agents broadcast or multicast their identity to the integrated agent. Further, where the agents know contact information about the integrated agent 220 through configuration set by the administrator, they can transmit their identity to the integrated agent 220. On receiving this information, the integrated agent contacts the device agents and gets further information about the devices in the SAN. In the third scheme, the integrated agent 220 builds a list of addresses from the network packet it sees on the network. It then contacts the systems having these address to discover the agents running on them. In the fourth scheme, the integrated agent 220 contact the name server in the SAN, always located at a well known address, and collects information about SAN devices from the name server. In the fifth scheme, the system administrator specifies a set of ranges of addresses to the integrated agents 220 which then scans these addresses to discover the devices in the SAN.

In addition to manageable devices, the SAN may have devices that have no management software or firmware, such as an unmanaged hub. Information about such devices can be obtained only manually from the SAN administrator. To autodiscover SAN devices and device management agents, the integrated agent applies several of the above methods.

Each device agent or device supplies information in response to the inquiries from the integrated management agent 220.

The agent can be configured, if necessary using the configuration component of the agent. For example, while the agent is running it is possible to dynamically add or remove device types using the configuration tool and let the agent know about it. It is also possible to stop and restart the agent using the configuration tool.

During day-to-day operation, one or more devices in the SAN may encounter errors and status changes. Some of these have to be logged for management and record keeping as well as later use by the SAN administrator or field service personnel. Some errors, such as failures of devices, may need the immediate attention of the SAN administrator and hence the administrator has to be notified immediately.

The various SAN devices 213, 214 and 215 generate traps to indicate errors, status change, etc. The trap handler 207 receives asynchronous traps generated by various devices and forwards them to the error and status handler ESH 218 to process them. In addition to processing incoming traps, the ESH is capable of generating outgoing traps for other management tools, generate alerts and send notification to the administrators.

Figure 3:
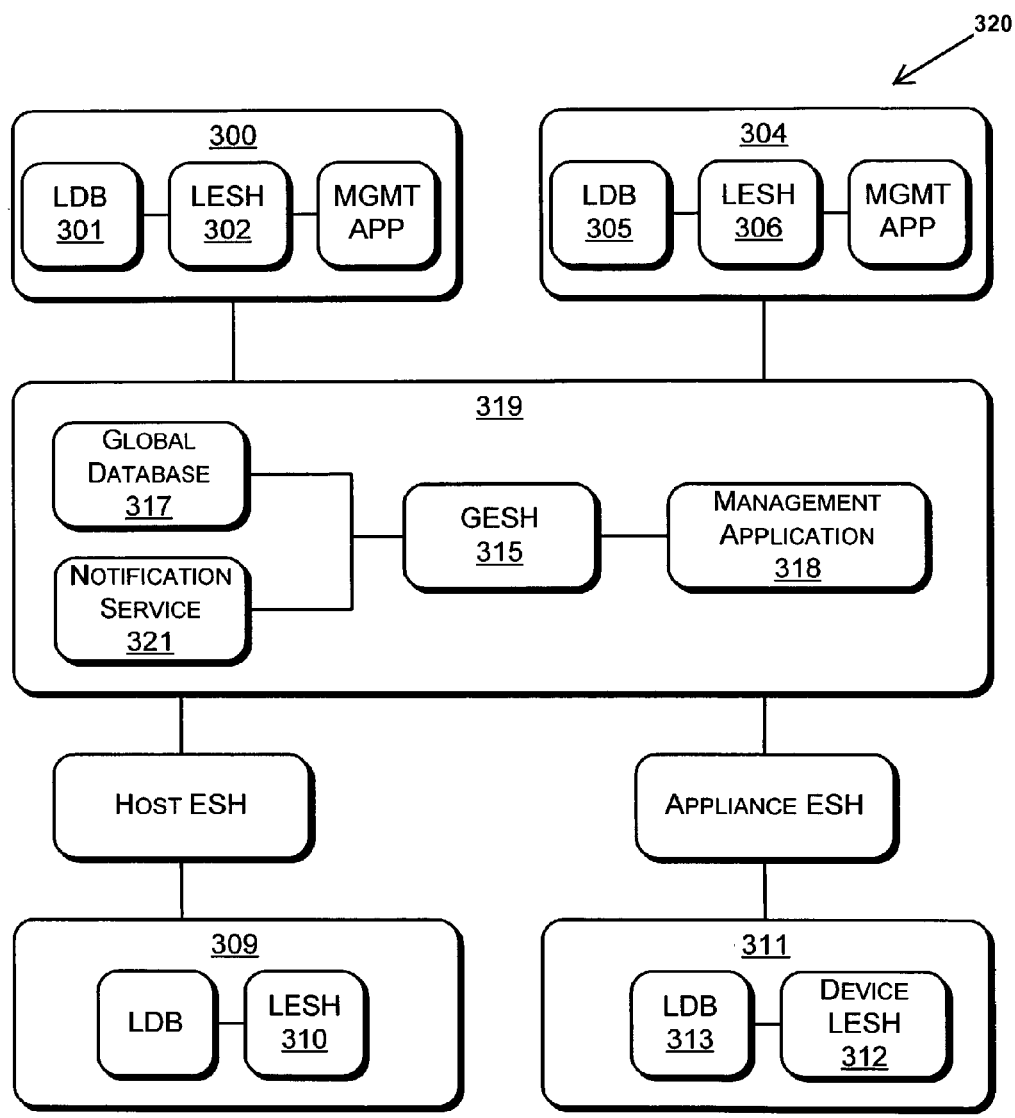
FIG. 3 is an architecture diagram of a hybrid error and status handler of the present invention.
Figure 4:
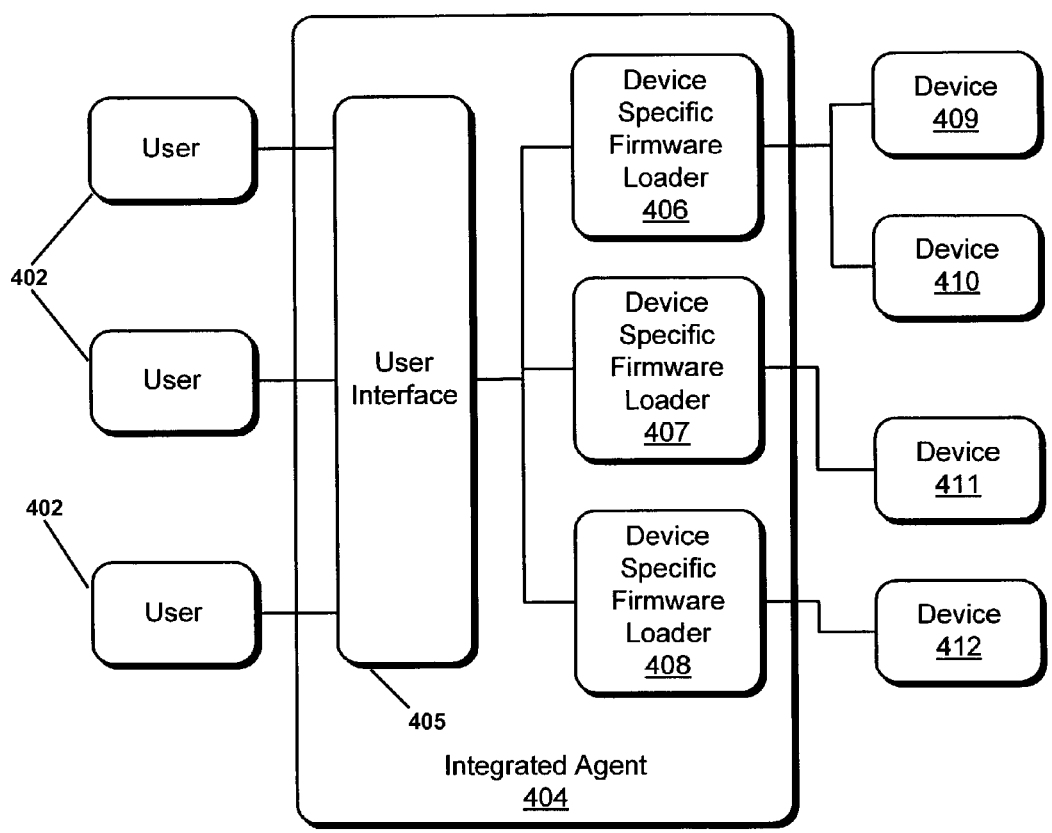
FIG. 4 is a diagram of a unified device firmware download system of the present invention.

FIG. 3 illustrates the ESH for handling error and status changes of SAN. This ESH has a hybrid architecture, in that some error and status processing is done at device level and some processing is done at a global level. SAN devices 300, 304, 309, and 311 come with various levels of error and status handling operable on them. This device level error and status handler is the local error and status handler LESH 302, 306, 310, and 312. Almost all SAN devices have an in-memory database LDB 301, 305, and 313 or registers to keep a limited amount of error and status information. The devices will supply this information when requested by the management agents.

There is a hierarchy of error and status handlers. The first level of error and status handlers are the LESH in the devices. The second level of error and status handlers is in the hosts and/or appliances. They may be built as an integral part of agents. The third level of error and status handler is the global error and status handler system 319. It has a global error and status handler GESH 315. The GESH keeps error and status information in the global database GDB 317. The system 319 has management application(s) 318 to manage the error and status information in the GDB. Such applications are used for purposes such as report generation, problem tracking and fixing and so on.

The GESH is normally a centralized error handler. There is only one GESH in a management environment. All lower-level error and status handlers in the SAN management environment send error and status information to the GESH for further processing. Where reliability is of at most importance, the GESH could run on a fault tolerant system. Where performance is important, the GESH could run on a high performance system. Where a fully distributed architecture is important, the GESH can be distributed as well.

Each level of error and status handler has a database associated with it to keep the error and status information. At the device level, they are in-memory databases while at the host level the databases may be in-memory or persistent. However, at the global level it is persistent database. Management stations can retrieve the contents of the database.

Those error and status handlers that have capability to send asynchronous data, automatically send important status changes and error conditions in the form of traps, events or alerts. Others send the information in response to client requests.

The global error and status handler 319 is a centralized system while the device and host level error and status handlers are distributed and hierarchical. Thus the architecture 320 is a hybrid of distributed, hierarchical and centralized error and status handling systems.

Some error and status changes result in alerts being generated automatically. They are sent to the administrator in various forms such as pager, email or programmatically using the notification service 321 in the system.

The SAN has many types of devices 409, 410, 411 and 412 such as switches, hubs, disk controllers, tape controllers, etc., having firmware in them. Sometimes it is necessary for the administrator to download firmware to the devices to fix bugs or upgrade to a newer version of the firmware. In earlier SANs, SAN devices have many different device-dependent schemes for downloading firmware. Administrators had to learn these device specific schemes as well as the characteristics of the devices to download firmware.

In the embodiment of the invention, a simple and unified scheme is provided for downloading firmware to the various devices. The integrated agent 404 provides a unified user interface 405 that hides the device specific download process and characteristics from the administrator. The device specific firmware loaders 406, 407, and 408 sits behind the user interface 405 hidden from the user.

The administrator selects the device or devices to which firmware is to be loaded and the firmware file to be used and then starts the firmware download. For example, the administrator 402 selects the devices 411 using the user interface 405, specifies the firmware file (not shown) and then clicks on a start firmware download button provided in the user interface. The user interface 405 passes the selected device list 411 and the firmware file to the device dependent firmware loader 407. This loader has knowledge about the characteristics of the device 411 as well as the firmware download procedure it requires. The device specific loader 407 loads firmware to the devices 411. When the loading is finished, the loader 407 informs the completion status to the user 402 through the user interface 405.

In this architecture, it is possible to dynamically add new device type specific firmware loaders to the integrated agent 404, or to delete existing loaders, while the integrated agent is running.

Before downloading firmware, the system authenticates the user. To ensure proper firmware is downloaded, the system preprocesses the firmware file, either off-line or on-line, to incorporate appropriate information in the firmware file. This could include version number, device specific operations to be performed during the firmware download process.

The administrator performs the same simple steps to download firmware to any type of device in the SAN.

While there have been described above the principles of the present invention in conjunction with specific embodiments thereof, it is to be clearly understood that the foregoing description is made only by way of example and not as a limitation to the scope of the invention. It is recognized that the teachings of the foregoing disclosure will suggest other modifications to those persons skilled in the relevant art. Such modifications may involve other features which are already known and which may be used instead of or in addition to features already described herein. In particular, it is anticipated that multiple integrated management agents of the present design may coexist on a SAN, each managing devices of a particular portion of the SAN or managing particular groups of devices according to their device types. Although claims have been formulated in this application to particular combinations of features, it is understood that the scope of the disclosure herein also includes any novel feature or combination of features disclosed or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A system comprising:
    a computer;
    an integrated management agent capable of managing components of a storage area network (SAN), the integrated management agent comprising a device agent;
    the device agent comprising an object-based device handler sublayer and a protocol-dependent device handler sublayer, the protocol-dependent device handler sublayer comprising multiple modules, each respective module of the multiple modules supporting a respective device-type-specific protocol; and
    wherein a particular module of the multiple modules that supports a particular device-type-specific protocol may be installed to or uninstalled from the protocol-dependent device handler sublayer independently of other modules of the multiple modules while the integrated management agent is running.

2. The system of claim 1, wherein the integrated management agent further comprises an object manager that represents the components of the SAN as objects, and wherein the object-based device handler sublayer provides an interface between the object manager and the protocol-dependent device handler sublayer to permit an object level interface to the devices.

3. The system of claim 1, wherein the integrated management agent further comprises a dynamic list of device-type-specific protocols that it is capable of using, wherein each device-type-specific protocol is associated with a list of objects and methods, and wherein a given list of objects and methods is added to the dynamic list when a given module of the multiple modules supporting a given device-type-specific protocol is installed to the protocol-dependent device handler sublayer.

4. The system of claim 2, wherein the integrated management agent further comprises a consistent user interface module coupled to the object manager, wherein at least one device type-specific module is installed, and wherein the at least one device type-specific module further comprises a device handler for coupling a storage system to the integrated management agent.

5. The system of claim 4, wherein at least one device type-specific module further comprises code for supporting a plurality of protocols to communicate with a plurality of devices.

6. The system of claim 5, wherein the management system further comprises a distributed error and status handler capable of handling error and status information from at least one device.

7. The system of claim 6, wherein at least a first level of the distributed error and status handler executes on the at least one device.

8. The system of claim 7, wherein the at least one machine selected from the group comprising a host and an appliance incorporates a second level of error and status handler.

9. The system of claim 7, wherein the distributed error and status handler further comprises a centralized global error and status handler level.

10. The system of claim 8, wherein the centralized global error and status handler level executes upon a fault tolerant system in a storage are network management environment.

11. The system of claim 1, wherein the integrated management agent further comprises a trap handler coupled to a notification module to receive traps from at least one SAN device and send notification to at least one system administrator.

12. The system of claim 11, wherein the integrated management agent is further capable of sending traps to support at least a second management system.

13. The system of claim 1, wherein the integrated management agent is capable of being configured with a configuration utility.

14. The system of claim 1, wherein the object manager further comprises a dynamic list indicating device types the integrated management agent is capable of handling, wherein installing device type-specific modules causes addition of device types to the dynamic list, and wherein addition of device types to the dynamic list does not require shutting down the integrated management agent.

15. The system of claim 14, wherein the network interconnection system further comprises at least one fibre channel switch, and wherein a device type-specific module is type specific to the at least one fibre channel switch.

16. The system of claim 1, wherein the integrated management system further comprises a firmware download module with unified user interface hiding device specific firmware download process and characteristics from the administrator.

17. The system of claim 1, wherein the integrated management agent is capable of discovering devices and agents in the SAN and their interconnection by applying a conglomerate method comprising at least two elements selected from the group comprising host and device agent broadcasting, multicasting device identity, collecting addresses from network traffic, collecting information from a name server, scanning a set of ranges of address supplied in configuration information, and collecting information about devices from configuration information.

18. The system of claim 1, wherein the integrated management agent is further capable of discovering devices and agents in the SAN and their interconnection by applying a conglomerate method comprising at least three elements selected from the group comprising host and device agent broadcasting, multicasting device identity, collecting addresses from network traffic, collecting information from a name server, scanning a set of ranges of address supplied in configuration information, and collecting information about devices from configuration information.

* * * * *

UNITED STATES PATENT AND TRADEMARK OFFICE
CERTIFICATE OF CORRECTION

| | | |
|---|---|---|
| PATENT NO. | : 8,122,114 B1 | |
| APPLICATION NO. | : 09/684472 | |
| DATED | : February 21, 2012 | |
| INVENTOR(S) | : Suban Krishnamoorthy et al. | |

It is certified that error appears in the above-identified patent and that said Letters Patent is hereby corrected as shown below:

In column 10, line 52, in Claim 10, delete "are" and insert -- area --, therefor.

Signed and Sealed this
Thirteenth Day of November, 2012

David J. Kappos
*Director of the United States Patent and Trademark Office*